US012802286B2

(12) United States Patent
Lee et al.

(10) Patent No.: US 12,802,286 B2
(45) Date of Patent: Nov. 17, 2026

(54) IMAGE GENERATION METHOD BASED ON RANDOMLY MOVED MASK ON IMAGE AND IMAGE GENERATION DEVICE

(71) Applicant: ASUSTek COMPUTER INC., Taipei City (TW)

(72) Inventors: I-Chang Lee, Taipei City (TW); Yi-Chen Lin, Taipei City (TW); Chien-Yi Wang, Taipei City (TW)

(73) Assignee: ASUSTeK COMPUTER INC., Taipei City (TW)

( * ) Notice: Subject to any disclaimer, the term of this patent is extended or adjusted under 35 U.S.C. 154(b) by 270 days.

(21) Appl. No.: 18/406,197

(22) Filed: Jan. 7, 2024

(65) Prior Publication Data

US 2024/0320871 A1 Sep. 26, 2024

(30) Foreign Application Priority Data

Mar. 21, 2023 (TW) ................................ 112110395

(51) Int. Cl.
*G06T 11/00* (2026.01)
*G06T 3/60* (2006.01)
*G06V 10/774* (2022.01)

(52) U.S. Cl.
CPC ................ *G06T 11/00* (2013.01); *G06T 3/60* (2013.01); *G06V 10/774* (2022.01)

(58) Field of Classification Search
None
See application file for complete search history.

(56) References Cited

U.S. PATENT DOCUMENTS

2007/0127788 A1* 6/2007 Kakinuma ........... G06V 40/161 382/118
2008/0193018 A1* 8/2008 Masuda ............... H04N 23/611 382/190
2008/0240598 A1* 10/2008 Hasegawa ................. G06T 5/40 382/254
2008/0260282 A1* 10/2008 Hasegawa ................. G06T 5/40 382/260
2011/0221932 A1* 9/2011 Ahn .......................... G06T 5/92 382/163
2012/0014608 A1* 1/2012 Watanabe ............... G06T 7/194 382/195
2012/0050279 A1* 3/2012 Nishibe ................ H04N 13/139 345/419

(Continued)

FOREIGN PATENT DOCUMENTS

CN 111222537 6/2020
CN 107808363 12/2020

(Continued)

*Primary Examiner* — Abderrahim Merouan
*Assistant Examiner* — Pawan Dhingra
(74) *Attorney, Agent, or Firm* — JCIPRNET

(57) ABSTRACT

An image generation method and an image generation device are disclosed. The method includes: reading a first image from a storage circuit; disposing an image mask on the first image, wherein the image mask covers a part of the image areas in the first image; moving, randomly, the image mask to change a covering range of the image mask in the first image; obtaining a second image from the first image according to the moved image mask; and storing the second image into the storage circuit.

10 Claims, 7 Drawing Sheets

(56) References Cited

U.S. PATENT DOCUMENTS

| | | | | |
|---|---|---|---|---|
| 2015/0269189 | A1* | 9/2015 | Tazoe | G06V 10/751 382/190 |
| 2017/0011212 | A1* | 1/2017 | Rowlingson | G06F 21/36 |
| 2019/0378607 | A1* | 12/2019 | Chen | G06F 21/6245 |
| 2020/0124980 | A1* | 4/2020 | Shin | G03F 1/36 |
| 2025/0069387 | A1* | 2/2025 | Milam | G16H 30/40 |

FOREIGN PATENT DOCUMENTS

| | | |
|---|---|---|
| CN | 114332100 | 4/2022 |
| CN | 114373109 | 4/2022 |
| CN | 114612584 | 6/2022 |
| CN | 115794089 | 3/2023 |

* cited by examiner

IMAGE GENERATION METHOD BASED ON RANDOMLY MOVED MASK ON IMAGE AND IMAGE GENERATION DEVICE

CROSS-REFERENCE TO RELATED APPLICATION

This application claims the priority benefit of Taiwan application serial no. 112110395, filed on Mar. 21, 2023. The entirety of the above-mentioned patent application is hereby incorporated by reference herein and made a part of this specification.

BACKGROUND

Technical Field

The application relates to an image generation method and an image generation device.

Description of Related Art

Traditionally, during the development and training stage of the image recognition models, developers often need to spend a lot of time collecting training images. For example, collecting a large number of the images related to the target to be recognized but different from each other in an artificial way, and then using these training images to train the image recognition model to improve its recognition ability for the target to be recognized. However, the efficiency of the method of collecting training images is low. In practice, it may even take a lot of time to collect enough training images to train the image recognition model, resulting in the delayed improvement of the image recognition ability of the model.

SUMMARY

The application provides an image generation method, which includes: reading a first image from a storage circuit; setting an image mask on the first image, wherein the image mask covers a portion of the image area of the first image; randomly moving the image mask to change the coverage area of the image mask in the first image, and the coverage area of the image mask does not exceed the edge of the first image; extracting a second image from the first image according to the moved image mask; and storing the second image in the storage circuit.

The application also provides an image generation device including a storage circuit and a processor. The processor is coupled to the storage circuit. The processor is configured to: reading a first image from the storage circuit; set an image mask on the first image, wherein the image mask covers a portion of the image area of the first image; randomly moving the image mask to change the coverage area of the image mask in the first image, and the coverage area of the image mask does not exceed the edge of the first image; extracting a second image from the first image based on the moved image mask; and storing the second image in the storage circuit.

Based on the above, after reading the first image from the storage circuit, the image mask can be set on the first image to cover a portion of the image area of the first image. Then, the image mask can be randomly moved to change the coverage area of the image mask in the first image. In particular, the coverage area of the image mask does not exceed the edge of the first image. Then, the second image can be extracted from the first image based on the moved image mask and stored in the storage circuit. Therefore, multiple images (i.e., the second image) that are similar but different from each other can be randomly generated based on a small amount of the images (i.e., the first image).

DESCRIPTION OF THE EMBODIMENTS

Figure 1:
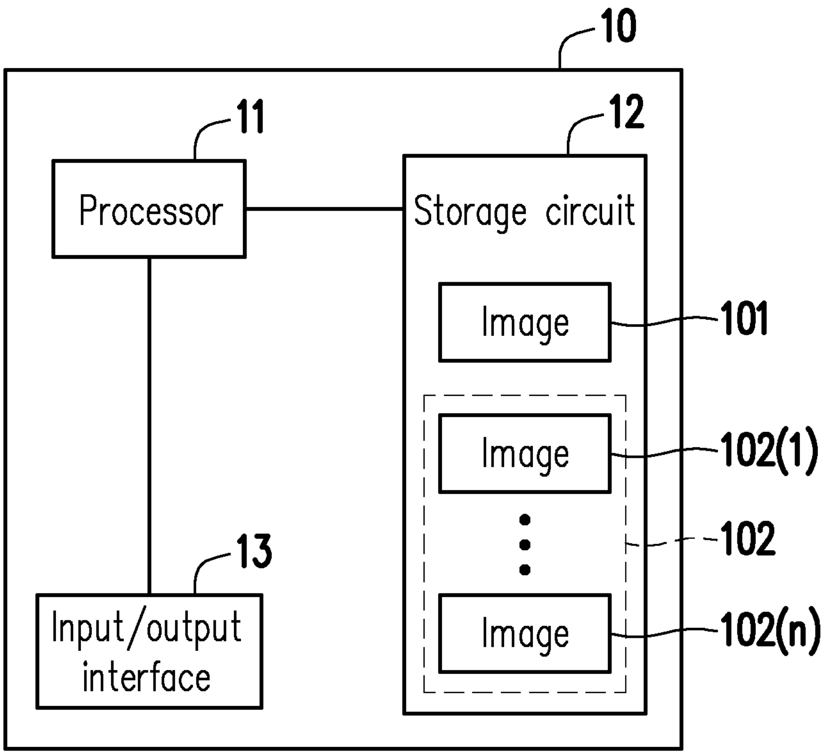
FIG. 1 is a schematic diagram of an image generation device according to an embodiment of the present invention.

Referring to FIG. 1, the electronic device (also known as an image generation device) 10 can be any electronic device with data storage and image processing functions, such as smartphones, tablets, laptops, personal computers, or servers, and the type of electronic device 10 is not limited to these.

The electronic device 10 may include a processor 11, a storage circuit 12, and an input/output interface 13. The processor 11 is responsible for the overall or partial operation of the electronic device 10. For example, the processor 11 may include a Central Processing Unit (CPU), a Graphics Processing Unit (GPU), or other programmable general-purpose or special-purpose microprocessors, Digital Signal Processors (DSPs), programmable controllers, Application Specific Integrated Circuits (ASICs), Programmable Logic Devices (PLDs), or combinations thereof.

The storage circuit 12 is coupled to the processor 11 and is used to store data. For example, the storage circuit 12 may include non-volatile storage circuits and volatile storage circuits. The non-volatile storage circuits may include Read Only Memory (ROM), flash memory, traditional hard disk drives (HDDs), or similar non-volatile storage media. The volatile storage circuits may include Dynamic Random Access Memory (DRAM) or similar volatile storage media.

The input/output interface 13 is coupled to the processor 11 and is used to receive input signals and/or send output signals. For example, the input/output interface 13 may include a display, a network interface card, a mouse, a keyboard, a touchpad, a touchscreen, a joystick, a remote control, a microphone, and/or a speaker, and the type of input/output interface 13 is not limited to these. In addition, the electronic device 10 may also include a battery, a power management circuit, and/or other types of circuit modules, which are not limited by the present invention.

In one embodiment, the storage circuit 12 may be used to store an image (also referred to as a first image) 101. The image 101 may include a two-dimensional or three-dimensional image. In addition, the number of the images 101 may be one or more, and the present invention is not limited thereto.

In one embodiment, the processor 11 may read the image 101 from the storage circuit 12. After obtaining the image 101, the processor 11 may set an image mask on the image 101. The image mask may (only) cover a portion of the image area of the image 101. It should be noted that the shape of the image mask may be rectangular, circular, elliptical, or other shapes, and the present invention is not limited thereto. In addition, the shape of the image mask may be the same or different from the shape of the image 101, and the present invention is not limited thereto.

In one embodiment, the processor 11 may generate the image mask based on a reduction ratio and an original size of the image 101. Therefore, the relationship between the size of the image mask and the original size of the image 101 may comply with the specifications of the reduction ratio. For example, assuming that the reduction ratio is 0.8, the relationship between the size of the generated image mask and the original size of the image 101 may be: the size of the image mask is 0.8 times the original size of the image 101. Alternatively, assuming that the reduction ratio is 0.9, the relationship between the size of the generated image mask and the original size of the image 101 may be: the size of the image mask is 0.9 times the original size of the image 101. It should be noted that the reduction ratio may also be other values between 0 and 1 (such as 0.7, 0.75, 0.85, or 0.95, etc.), and the present invention is not limited thereto.

In one embodiment, assuming that the shape of the image 101 is rectangular, the original size of the image 101 can be represented or defined by the length, width, and/or total area of the image 101. Alternatively, in one embodiment, assuming that the shape of the image 101 is circular or elliptical, the original size of the image 101 can be represented or defined by the radius and/or total area of the image 101. Similarly, in one embodiment, assuming that the shape of the image mask is rectangular, the size of the image mask can be represented or defined by the length, width, and/or total area of the image mask. Alternatively, in one embodiment, assuming that the shape of the image mask is circular or elliptical, the size of the image mask can be represented or defined by the radius and/or total area of the image mask.

In one embodiment, the processor 11 can multiply the original size of the image 101 by a scaling ratio to determine the size of the image mask. For example, the processor 11 can multiply the length, width, radius, or total area of the image 101 by the scaling ratio to obtain the length, width, radius, or total area of the image mask.

In one embodiment, the processor 11 can receive user input through input/output interface 13. The user input may contain information about the scaling ratio input or selected by the user. The processor 11 can determine the scaling ratio based on the user input. Alternatively, in one embodiment, the scaling ratio may also be a default value or selected by the user from multiple candidate values, without limitation to the present invention.

In one embodiment, after setting the image mask, the processor 11 can randomly move the image mask to change the coverage area of the image mask in image 101. It should be noted that the coverage area of the image mask cannot exceed the edge of the image 101. That is, the image mask can be randomly moved (e.g., translated and/or rotated) in the image 101 without exceeding the edge of the image 101, to change the position of the image mask and its coverage area in the image 101.

In one embodiment, after random movement of the image mask, the processor 11 can extract an image (also referred to as a second image) 102 from the image 101 based on the moved image mask. For example, after random movement of the image mask, the processor 11 can extract a portion of the image 101 within the current coverage area of the image mask and generate the image 102 based on the extracted image. Then, the processor 11 can store the image 102 in the storage circuit 12.

In one embodiment, the number of the images 102 can be one. In another embodiment, the image 102 can include multiple images 102(1) to **102(*n*). In one embodiment, the processor 11 can randomly move the image mask and extract image 102(*i*) from the image 101 based on the moved image mask. After extracting image 102(*i*), the processor 11 can again randomly move the image mask and extract image 102(*j*) from the image 101 based on the moved image mask. Both i and j are between 1 and n, and i is not equal to j. Similarly, in one embodiment, the processor 11 can randomly generate multiple images 102(1) to 102(*n*) that are similar but different from each other based on a single image 101**.

Figure 2:
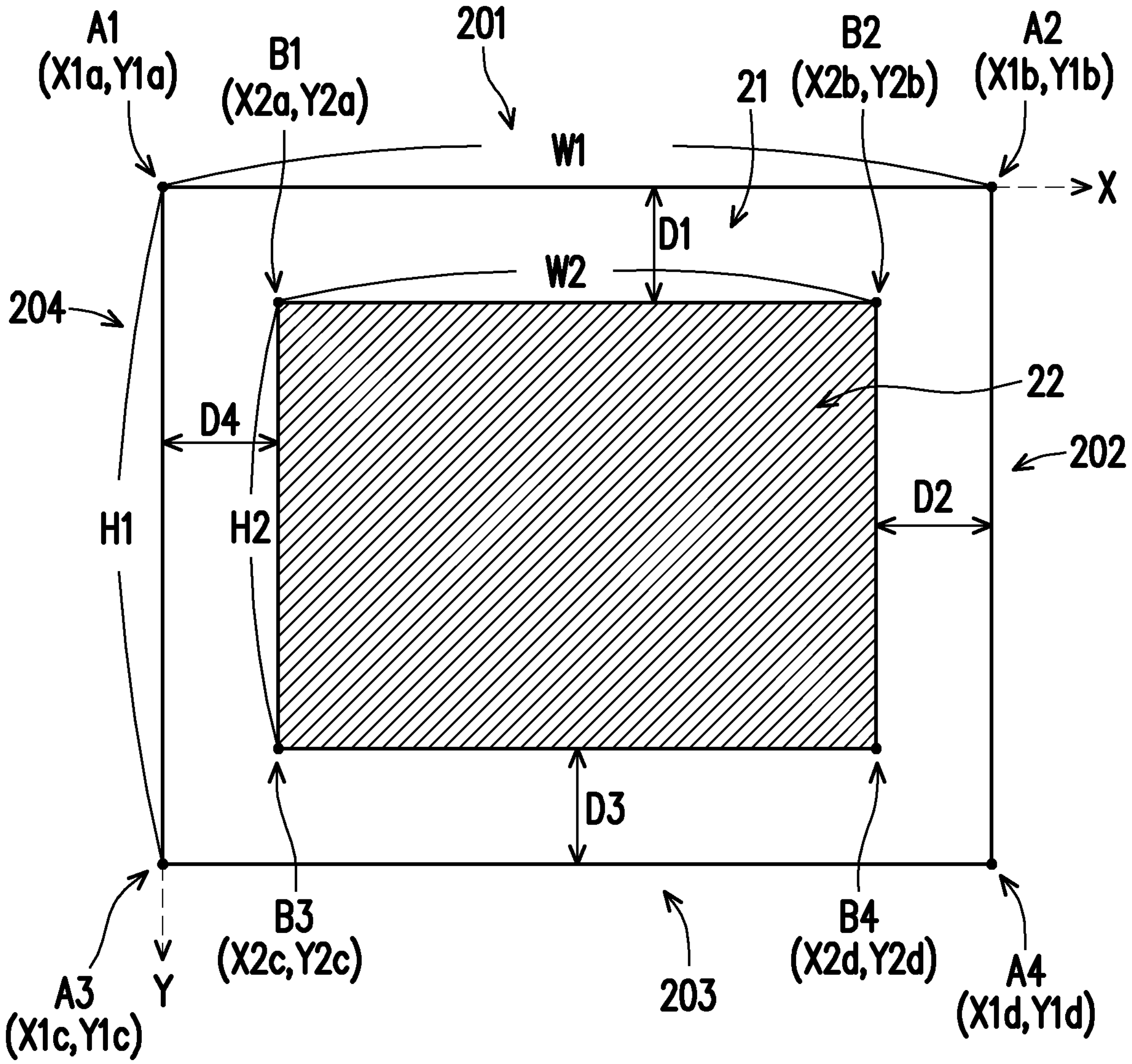
FIG. 2 is a schematic diagram of the first image and the image mask according to an embodiment of the present invention.

Referring to FIG. 1 and FIG. 2. In one embodiment, it is assumed that the image 101 includes an image 21. The shape of the image 21 is rectangular, with its length and width represented by H1 and W1, respectively. The width direction of the image 21 is parallel to a reference direction (also known as the first reference direction) in the two-dimensional coordinate space (also known as the X-Y plane). For example, the first reference direction may be the +/−X axis direction in the two-dimensional coordinate space. The length direction of the image 21 is parallel to another reference direction (also known as the second reference direction) in the two-dimensional coordinate space. For example, the second reference direction may be the +/−Y axis direction in the two-dimensional coordinate space. In addition, the image 21 has four edges 201-204 and four endpoints A1-A4. The coordinates of endpoints A1-A4 are (X1*a*, Y1*a*), (X1*b*, Y1*b*), (X1*c*, Y1*c*), and (X1*d*, Y1*d*), respectively. Specifically, (X1*b*, Y1*b*)=(X1*a*+W1, Y1*a*), (X1*c*, Y1*c*)=(X1*a*, Yla+H1), and (Xld, Y1*d*)=(X1*a*+W1, Yla+H1).

In one embodiment, the processor 11 can set an image mask 22 in the image 21. The shape of the image mask 22 is also rectangular, with its length and width represented by H2 and W2, respectively. For example, if the scaling ratio corresponding to the width is S1 and the scaling ratio corresponding to the length is S2, then W2=W1×S1 and H2=H1×S2. Both S1 and S2 are values between 0 and 1.

In one embodiment, the width direction of the image mask 22 is parallel to the first reference direction (+/−X axis direction). The length direction of the image mask 22 is parallel to the second reference direction (+/−Y axis direction). The image mask 22 has four endpoints B1~B4. The coordinates of endpoints B1~B4 are (X2*a*, Y2*a*), (X2*b*, Y2*b*), (X2*c*, Y2*c*), and (X2*d*, Y2*d*), respectively. Where (X2*b*, Y2*b*)=(X2*a*+W2, Y2*a*), (X2*c*, Y2*c*)=(X2*a*, Y2*a*+H2), and (X2*d*, Y2*d*)=(X2*a*+W2, Y2*a*+H2). In addition, the coverage area of the image mask 22 in the image 21 is indicated by diagonal lines in FIG. 2. In one embodiment, the initial position of the image mask 22 can also be adjusted according to practical needs, and the present invention is not limited thereto.

In one embodiment, the processor 11 can randomly determine a movement direction and a movement distance of the image mask 21. For example, the processor 11 can generate multiple random values based on one or more random functions. The processor 11 can use one of these random values (also known as the first random value) to determine the movement direction of the image mask 21. For example, different first random values correspond to different movement directions. In addition, the processor 11 can use another one of these random values (also known as the second random value) to determine the movement distance of the image mask 21. For example, different second random values correspond to different movement distances. Then, the processor 11 can move (i.e., translate) the image mask 21 according to the determined movement direction and movement distance.

In one embodiment, the processor 11 can determine a critical value for the movement distance corresponding to the Y-axis direction (also known as a first movement distance critical value) based on a distance D1 between the edge 201 of the image 21 and the endpoint B1 (or B2) of the image mask 22. Specifically, the endpoint B1 (or B2) is closer to the edge 201 in the Y-axis direction than the other endpoints B3 (or B4) of the image mask 22. For example, the first movement distance critical value can be less than or equal to the distance D1. Then, the processor 11 can limit the movement distance of the image mask 22 in the Y-axis direction to no more than the first movement distance critical value. In other words, the processor 11 can limit the random movement distance of the image mask 22 in the Y-axis direction based on the first movement distance critical value. It can prevent the coverage area of the moved image mask 22 from exceeding the edge 201 of the image 21.

In one embodiment, the processor 11 can determine a critical value for the movement distance corresponding to the +X-axis direction (also known as a second movement distance critical value) based on a distance D2 between the edge 202 of the image 22 and the endpoint B2 (or B4) of the image mask 22. Specifically, the endpoint B2 (or B4) is closer to the edge 202 in the +X-axis direction than the other endpoints B1 (or B3) of the image mask 22. For example, the second movement distance critical value can be less than or equal to the distance D2. Then, the processor 11 can limit the movement distance of the image mask 22 in the +X-axis direction to no more than the second movement distance critical value. In other words, the processor 11 can limit the random movement distance of the image mask 22 in the +X-axis direction based on the second movement distance critical value. It can prevent the coverage area of the moved image mask 22 from exceeding the edge 202 of the image 21.

In one embodiment, the processor 11 can determine a critical value for the movement distance corresponding to the +Y axis based on a distance D3 between the edge 203 of the image 22 and the endpoint B3 (or B4) of the image mask 22. Specifically, the endpoint B3 (or B4) is closer to the edge 203 in the +Y axis direction than the other endpoints B1 (or B2) of the image mask 22. For example, the third critical value for the movement distance can be less than or equal to the distance D3. Then, the processor 11 can limit the movement distance of the image mask 22 in the +Y axis direction to no more than the third critical value. In other words, the processor 11 can limit the random movement distance of the image mask 22 in the +Y axis direction based on the third critical value, thereby avoiding the coverage area of the moved image mask 22 from exceeding the edge 203 of the image 21.

In one embodiment, the processor 11 can determine a critical value for the movement distance corresponding to the X axis based on a distance D4 between the edge 204 of the image 22 and the endpoint B1 (or B3) of the image mask 22. Specifically, the endpoint B1 (or B3) is closer to the edge 204 in the X axis direction than the other endpoints B2 (or B4) of the image mask 22. For example, the fourth critical value for the movement distance can be less than or equal to the distance D4. Then, the processor 11 can limit the movement distance of the image mask 22 in the X axis direction to no more than the fourth critical value. In other words, the processor 11 can limit the random movement distance of the image mask 22 in the X axis direction based on the fourth critical value, thereby avoiding the coverage area of the moved image mask 22 from exceeding the edge 204 of the image 21.

Figure 3:
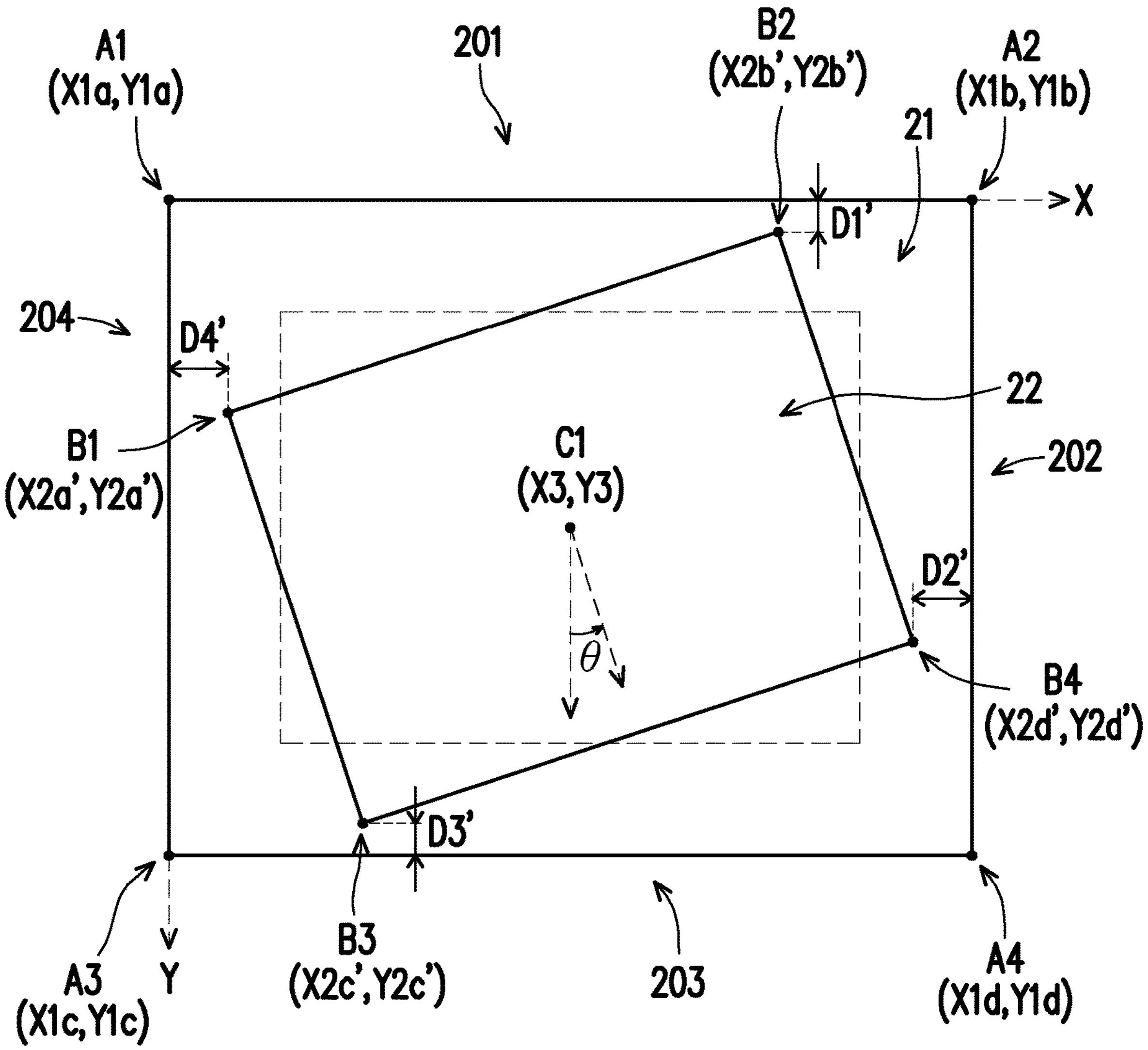
FIG. 3 is a schematic diagram of a rotating image mask according to an embodiment of the present invention.

Referring to FIG. 1 and FIG. 3, in one embodiment, the processor 11 can randomly determine a rotation angle (also referred to as the first rotation angle) θ for image mask 22. For example, the rotation angle θ can be any angle between 0 and 360 degrees. The processor 11 can rotate image mask 22 based on the rotation angle θ. For example, the processor 11 can rotate image mask 22 by θ degrees on the X-Y plane with the center point C1 of the image mask 22 as the axis. For example, the coordinates of center point C1 can be (X3, Y3). After rotating image mask 22 based on the rotation angle θ, the coordinates of the four endpoints B1 to B4 of the image mask 22 can be updated to (X2*a*', Y2*a*'), (X2*b*', Y2*b*'), (X2*c*', Y2*c*'), and (X2*d*', Y2*d*'), respectively.

In one embodiment, based on the updated coordinates of endpoints B1 to B4, the processor 11 can determine whether the coverage area of the rotated image mask 22 exceeds any edge of the image 21. In one embodiment, if the coverage area of the rotated image mask 22 exceeds any edge of the image 21, the processor 11 can discard the rotation of the image mask 22. In one embodiment, if the coverage area of the rotated image mask 22 does not exceed any edge of the image 21, the processor 11 can retain the rotation of the image mask 22.

In one embodiment, if the coverage area of the rotated image mask 22 exceeds any edge of the image 21, the processor 11 can randomly determine another rotation angle (also referred to as the second rotation angle) for image mask 22. For example, the second rotation angle can also be any angle between 0 and 360 degrees, and the first rotation angle is different from the second rotation angle. Then, the processor 11 can rotate image mask 22 based on the second rotation angle. In one embodiment, the processor 11 can repeatedly rotate image mask 22 using different randomly determined rotation angles until the rotated image mask 22 does not exceed any edge of the image 21. It should be noted that in one embodiment, the processor 11 can also determine the first rotation angle and/or the second rotation angle based on user operation, and the present invention is not limited thereto.

In one embodiment, after rotating the image mask 22, the processor 11 can randomly determine a movement direction and a movement distance of the image mask 22. Then, the processor 11 can move (i.e., translate) the image mask 21 based on the randomly determined movement direction and movement distance.

In one embodiment, after rotating the image mask 22, the processor 11 can obtain distances D1', D2', D3', and D4'. The distance D1' is the distance between endpoint B2 of the rotated image mask 22 and the edge 201 of the image 21 (i.e., the shortest distance between the edge of the image mask 22 and the edge 201). The distance D2' is the distance between endpoint B4 of the rotated image mask 22 and the edge 202 of the image 21 (i.e., the shortest distance between the edge of the image mask 22 and the edge 202). The distance D3' is the distance between endpoint B3 of the rotated image mask 22 and the edge 203 of the image 21 (i.e., the shortest distance between the edge of the image mask 22 and the edge 203). The distance D4' is the distance between endpoint B1 of the rotated image mask 22 and the edge 204 of the image 21 (i.e., the shortest distance between the edge of the image mask 22 and the edge 204). The processor 11 can update the first, second, third, and fourth critical distance thresholds based on the distances D1', D2', D3', and D4', respectively. For example, the updated first, second, third, and fourth critical distance thresholds can be less than or equal to distances D1', D2', D3', and D4', respectively.

In one embodiment, after rotating the image mask 22, the processor 11 can limit the movement distance of the image mask 22 in the −Y axis direction to not exceed the updated first movement distance critical value, limit the movement distance of the image mask 22 in the +X axis direction to not exceed the updated second movement distance critical value, limit the movement distance of the image mask 22 in the +Y axis direction to not exceed the updated third movement distance critical value, and limit the movement distance of the image mask 22 in the −X axis direction to not exceed the updated fourth movement distance critical value. Based on these movement distance critical values, the processor 11 can randomly move (e.g., translate) the image mask 22. It can prevent the coverage area of the moved (i.e., rotated and translated) image mask 22 from exceeding any edge of the image 21. Then, the processor 11 can generate image 102 based on the moved image mask 22.

In one embodiment, the processor 11 can continuously move (e.g., rotate and/or translate) the image mask 22. The processor 11 can sequentially generate images 102(1) to 102(*n*) of FIG. 1 based on the continuously moved image mask 22. The relevant operation details have been described in detail above and will not be repeated here.

Figure 4:
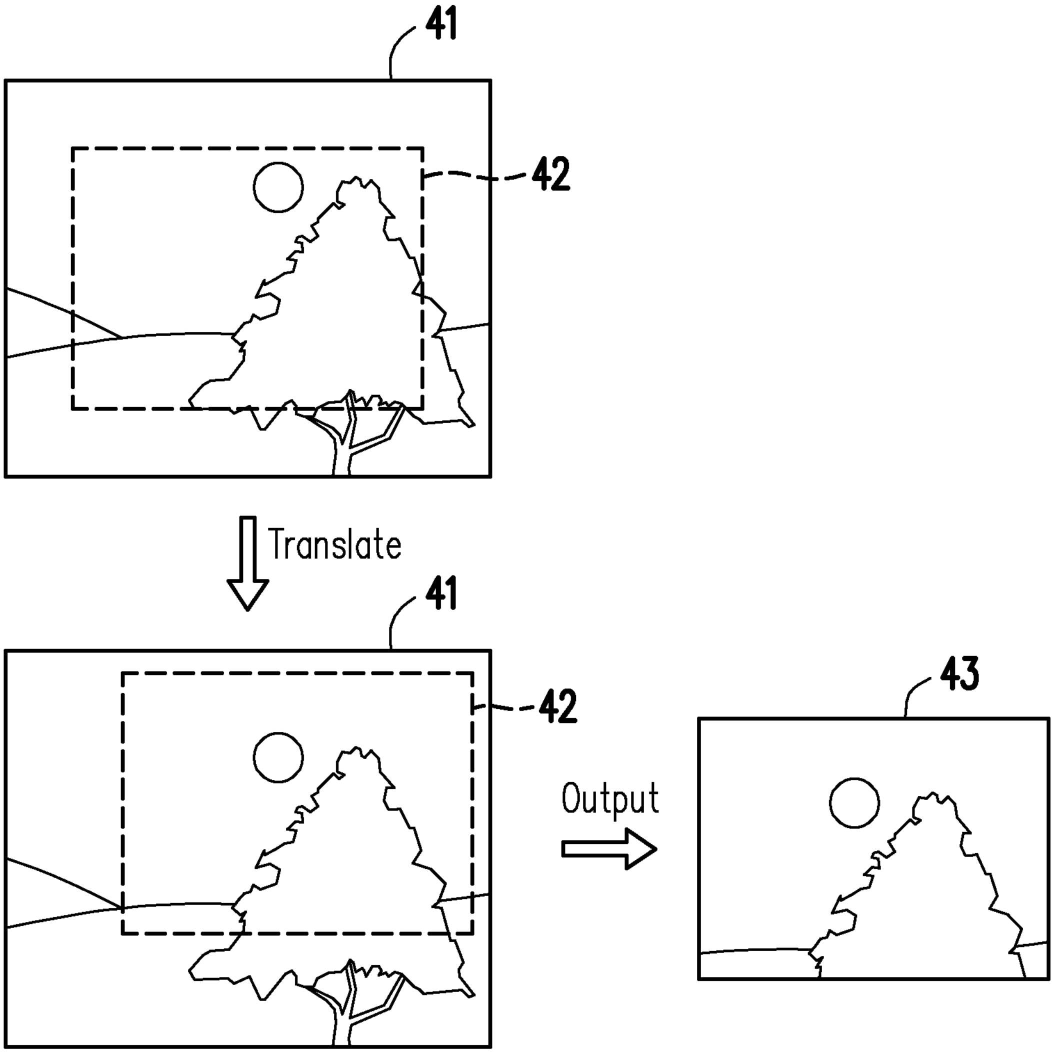
FIG. 4 is a schematic diagram of a translating image mask and the second image generated based on the moved image mask according to an embodiment of the present invention.

Referring to FIG. 1 and FIG. 4, in one embodiment, assuming that the image 101 includes an image 41, and the image 102 includes an image 43. After setting the image mask 42, the processor 11 can randomly move (e.g., translate) the image mask 42 to change the coverage area of the image mask 42 on the image 41. After moving the image mask 42, the processor 11 can extract the image within the coverage area of the image mask 42 from the image 41 and generate the image 43 based on the extracted image.

Figure 5:
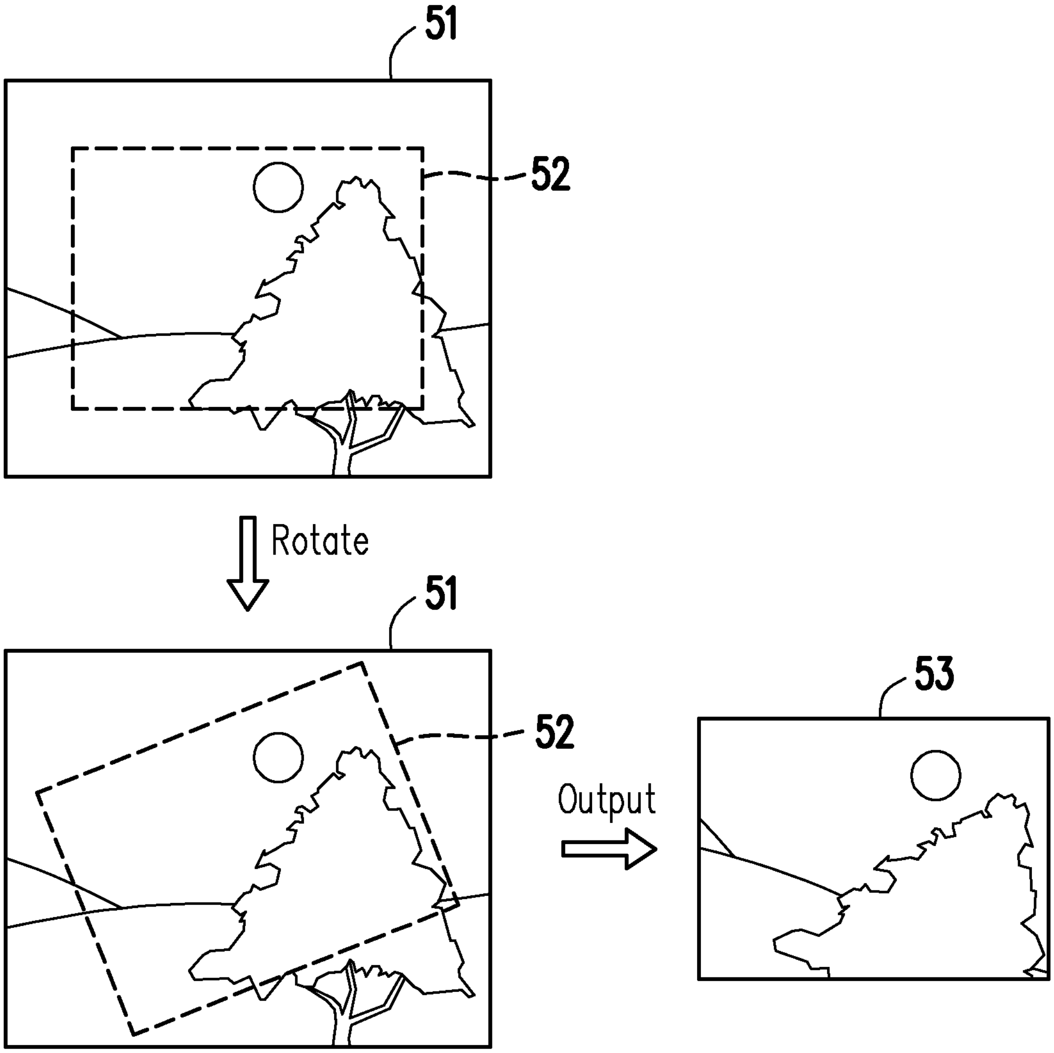
FIG. 5 is a schematic diagram of a translating image mask and the second image generated based on the translated image mask according to an embodiment of the present invention.

Referring to FIG. 1 and FIG. 5, in one embodiment, assuming that the image 101 includes an image 51, and the image 102 includes an image 53. After setting the image mask 52, the processor 11 can randomly move (e.g., rotate) the image mask 52 to change the coverage area of the image mask 52 on the image 51. After moving the image mask 52, the processor 11 can extract the image within the coverage area of the image mask 52 from the image 51 and generate the image 53 based on the extracted image.

Figure 6:
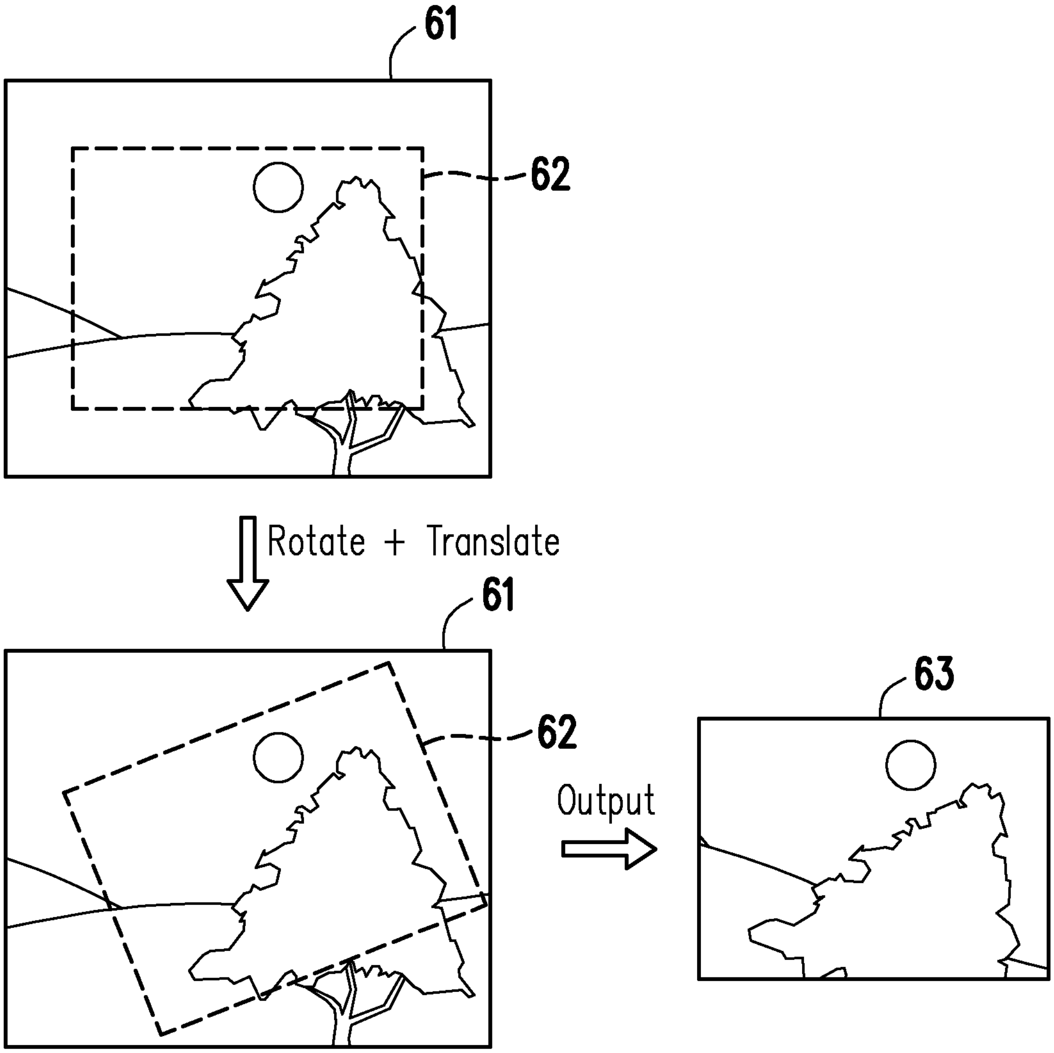
FIG. 6 is a schematic diagram of a translating image mask and the second image generated based on the translated image mask according to an embodiment of the present invention.

Referring to FIG. 1 and FIG. 6, in one embodiment, assuming that the image 101 includes an image 61, and the image 102 includes an image 63. After setting the image mask 62, the processor 11 can randomly move (e.g., rotate and translate) the image mask 62 to change the coverage area of the image mask 62 on the image 61. After moving the image mask 62, the processor 11 can extract the image within the coverage area of the image mask 62 from the image 61 and generate the image 63 based on the extracted image.

It should be noted that the setting and movement of the image mask in FIG. 2 to FIG. 6 are examples and are not intended to limit the present invention. For example, in another embodiment, the image mask can also be moved to other positions in the first image and/or rotated based on different rotation angles, which is not limited by the present invention.

In one embodiment, the image 101 in FIG. 1 can be regarded as a seed for generating image 102. That is, the processor 11 can generate multiple images 102(1) to 102(*n*) that are similar but different based on the image 101. Then, the images 102(1) to 102(*n*) can be used as training data to train artificial intelligence models (e.g., deep learning models) for supporting machine vision or image recognition, in order to improve the image recognition ability of the artificial intelligence models.

Figure 7:
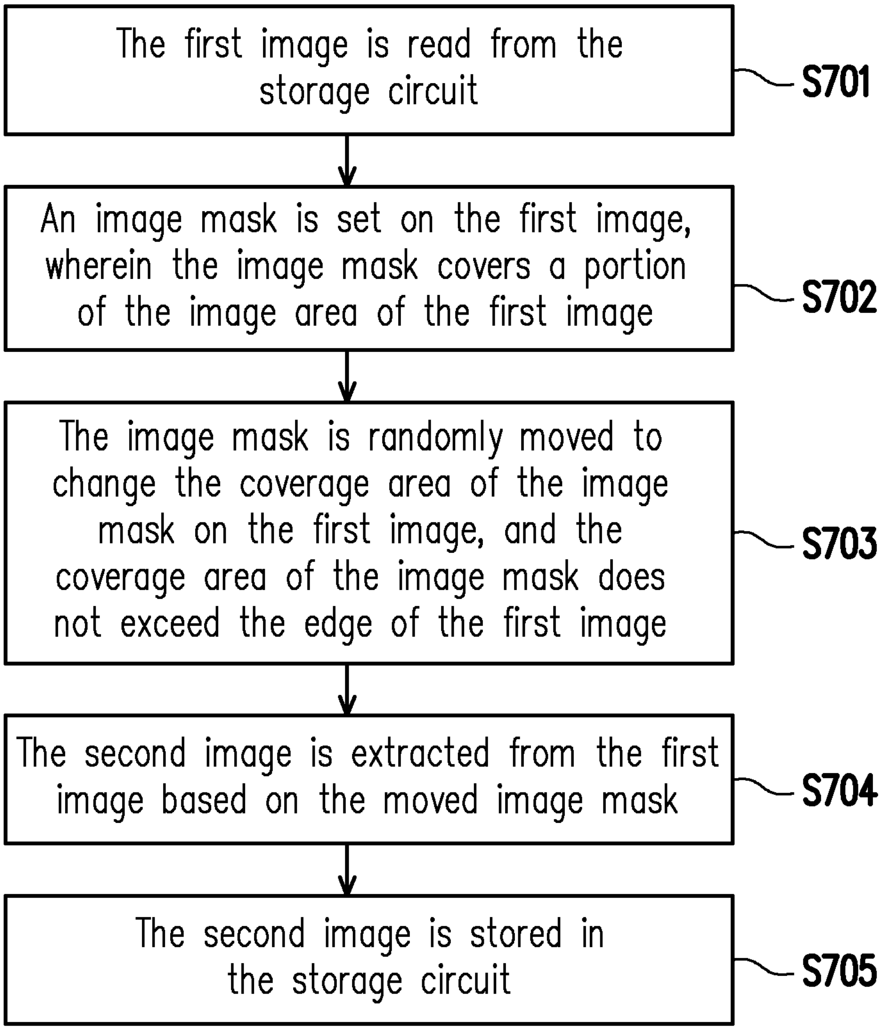
FIG. 7 is a flowchart of the image generation method according to an embodiment of the present invention.

Referring to FIG. 7, in step S701, the first image is read from the storage circuit. In step S702, an image mask is set on the first image, where the image mask covers a portion of the image area of the first image. In step S703, the image mask is randomly moved to change the coverage area of the image mask on the first image, and the coverage area of the image mask does not exceed the edge of the first image. In step S704, the second image is extracted from the first image based on the moved image mask. In step S705, the second image is stored in the storage circuit.

However, the steps in FIG. 7 have been described in detail above and will not be repeated here. It should be noted that the steps in FIG. 7 can be implemented as multiple codes or circuits, and the present invention is not limited thereto. In addition, the method in FIG. 7 can be used in conjunction with the above examples and embodiments, or can be used alone, and the present invention is not limited thereto.

In summary, by randomly moving the image mask in the first image, multiple second images that are similar but different can be randomly generated. Therefore, a small amount of the images (i.e., the first image) can be used to efficiently generate multiple images (i.e., the second image) that are similar but different, thereby effectively improving the efficiency of generating training data for artificial intelligence models. It should be noted that the generated second images can also be used for other purposes (such as building image libraries), not limited to training artificial intelligence models.

Although the present invention has been disclosed with reference to the embodiments, it is not intended to limit the present invention. Those skilled in the art may make some modifications and refinements within the spirit and scope of the present invention. Therefore, the scope of protection of the present invention shall be determined by the appended claims.

What is claimed is:

1. An image generation method comprising: reading a first image from a storage circuit; setting an image mask on the first image, wherein the image mask covers a portion of an image area of the first image; moving the image mask randomly to change a coverage area of the image mask in the first image, and the coverage area of the image mask does not exceed an edge of the first image, wherein the step of randomly moving the image mask includes: determining a movement direction and a movement distance of the image mask randomly; moving the image mask based on the determined movement direction and movement distance, determining a critical value of the movement distance corresponding to a reference direction based on a distance between a first edge of the first image and a first endpoint of the image mask in the reference direction, wherein the first endpoint is closer to the first edge of the first image in the reference direction than the other endpoints of the image mask in the reference direction; and limiting the movement distance of the image mask in the reference direction to not exceed the critical value of the movement distance; extracting a second image from the first image based on the moved image mask; storing the second image in the storage circuit; and training an artificial intelligence model based on training data comprising the second image stored in the storage circuit.

2. The image generation method according to claim 1, wherein the step of setting the image mask on the first image includes:

generating the image mask based on a reduction ratio and an original size of the first image.

3. The image generation method according to claim 2, wherein the step of setting the image mask on the first image further includes:

receiving a user input; and determining the reduction ratio based on the user input.

4. The image generation method according to claim 1, wherein the step of randomly moving the image mask comprises:

determining a first rotation angle of the image mask randomly; and rotating the image mask based on the first rotation angle.

5. The image generation method according to claim 4 further comprises:

determining a second rotation angle of the image mask randomly in response to the coverage area of the rotated image mask exceeding the edge of the first image, wherein the first rotation angle is different from the second rotation angle; and re-rotating the image mask based on the second rotation angle.

6. An image generation device comprising: a storage circuit; and a processor coupled to the storage circuit, wherein the processor is configured to: read a first image from the storage circuit; set an image mask on the first image, wherein the image mask covers a portion of an image area of the first image; move the image mask randomly to change a coverage area of the image mask in the first image, and the coverage area of the image mask does not exceed an edge of the first image, wherein the operation of randomly moving the image mask comprises: determining a movement direction and a movement distance of the image mask randomly; moving the image mask based on the movement direction and the movement distance; determining a critical value of the movement distance corresponding to a reference direction based on a distance between a first edge of the first image and a first endpoint of the image mask in the reference direction, wherein the first endpoint is closer to the first edge of the first image than the other endpoints of the image mask in the reference direction; and limiting the movement distance of the image mask in the reference direction to not exceed the critical value of the movement distance; extract a second image from the first image based on the moved image mask; store the second image in the storage circuit; and train an artificial intelligence model based on training data comprising the second image stored in the storage circuit.

7. The image generation device according to claim 6, wherein the operation of setting the image mask on the first image by the processor includes:

generating the image mask based on a reduction ratio and an original size of the first image.

8. The image generation device according to claim 7, wherein the operation of the processor to set the image mask on the first image further comprises:

receiving a user input; and determining the reduction ratio based on the user input.

9. The image generation device according to claim 6, wherein the operation of the processor to randomly move the image mask comprises:

determining a first rotation angle of the image mask randomly; and rotating the image mask based on the first rotation angle.

10. The image generation device according to claim 9, wherein the operation of the processor to randomly move the image mask further comprises:

determining a second rotation angle of the image mask randomly in response to the coverage area of the rotated image mask exceeding the edge of the first image, wherein the first rotation angle is different from the second rotation angle; and re-rotating the image mask based on the second rotation angle.

* * * * *